US009900651B2

(12) United States Patent
Son

(10) Patent No.: US 9,900,651 B2
(45) Date of Patent: Feb. 20, 2018

(54) DIGITAL DEVICE AND METHOD OF PROCESSING SERVICE DATA THEREOF

(71) Applicant: LG ELECTRONICS INC., Seoul (KR)

(72) Inventor: Chulmin Son, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 14/901,519

(22) PCT Filed: Jun. 27, 2014

(86) PCT No.: PCT/KR2014/005732
§ 371 (c)(1),
(2) Date: Dec. 28, 2015

(87) PCT Pub. No.: WO2014/209053
PCT Pub. Date: Dec. 31, 2014

(65) Prior Publication Data
US 2016/0142760 A1 May 19, 2016

(30) Foreign Application Priority Data

Jun. 28, 2013 (KR) ........................ 10-2013-0075732

(51) Int. Cl.
*H04N 7/173* (2011.01)
*H04N 21/431* (2011.01)
(Continued)

(52) U.S. Cl.
CPC ..... *H04N 21/4316* (2013.01); *H04N 21/4383* (2013.01); *H04N 21/4622* (2013.01);
(Continued)

(58) Field of Classification Search
CPC ....... H04N 2005/44521; H04N 21/436; H04N 21/64707; H04N 21/4725; H04N 21/858;
(Continued)

(56) References Cited

U.S. PATENT DOCUMENTS

| 6,154,771 A * | 11/2000 | Rangan ..................... H04N 5/76 345/660 |
| 2005/0157948 A1 | 7/2005 | Lee |
| 2007/0211174 A1* | 9/2007 | Putterman .......... H04N 5/44591 348/588 |
| 2008/0295022 A1 | 11/2008 | Valdes et al. |
| 2009/0086731 A1 | 4/2009 | Lee et al. |
| 2011/0113354 A1* | 5/2011 | Thiyagarajan ........... G09G 5/14 715/760 |
| 2012/0210367 A1* | 8/2012 | Lee .................... H04N 21/4316 725/56 |
| 2012/0272155 A1* | 10/2012 | Wan .................. G06F 17/30899 715/739 |

(Continued)

FOREIGN PATENT DOCUMENTS

KR 10-1137802 B1 4/2012

OTHER PUBLICATIONS

Written Opinion of the International Search Authority dated Oct. 8, 2014 issued in Application No. PCT/KR2014/005732.

(Continued)

*Primary Examiner* — Ngoc Vu
(74) *Attorney, Agent, or Firm* — KED & Associates LLP

(57) ABSTRACT

In the disclosure, various embodiments of a service system, a digital device and a method of processing a service are disclosed. Here, an embodiment of the digital device includes a receiver receiving a broadcast signal which contains a content and signaling information including channel information by tuning a channel, a user interface receiving a request for executing a web browser and a first user action requesting to select a first video included in a first web page through the executed web browser, a controller controlling to execute the web browser, output a first web page including the first video according to the request, output a picture-in-picture (PIP) window reproducing the first video included in the first web page on a screen according to the first user action, and an output unit outputting the web browser outputting the first web page and the PIP window.

20 Claims, 13 Drawing Sheets

(51) Int. Cl.
  *H04N 21/462* (2011.01)
  *H04N 21/4782* (2011.01)
  *H04N 21/482* (2011.01)
  *H04N 21/438* (2011.01)
  *H04N 21/472* (2011.01)
  *H04N 21/643* (2011.01)

(52) U.S. Cl.
  CPC ... *H04N 21/4782* (2013.01); *H04N 21/47202* (2013.01); *H04N 21/482* (2013.01); *H04N 21/64322* (2013.01)

(58) Field of Classification Search
  CPC ........... H04N 21/8583; H04N 21/8586; H04N 29/06027; H04N 29/06462; H04N 29/06; H04N 29/06523; H04N 29/08072; H04N 21/4622; H04N 5/44543; H04N 7/17318; H04N 21/235; G06F 17/3089; G06F 17/30873; G06F 17/30905; G06F 9/4443; G06F 17/30899

See application file for complete search history.

(56) References Cited

U.S. PATENT DOCUMENTS

| | | | |
|---|---|---|---|
| 2013/0055313 A1* | 2/2013 | Eyer | H04N 21/482 725/49 |
| 2013/0132211 A1 | 5/2013 | Tsai et al. | |
| 2013/0347018 A1* | 12/2013 | Limp | H04N 21/4826 725/19 |

OTHER PUBLICATIONS

International Search Report dated Oct. 8, 2014 issued in Application No. PCT/KR2014/005732 (English text).

* cited by examiner

[Fig. 1]
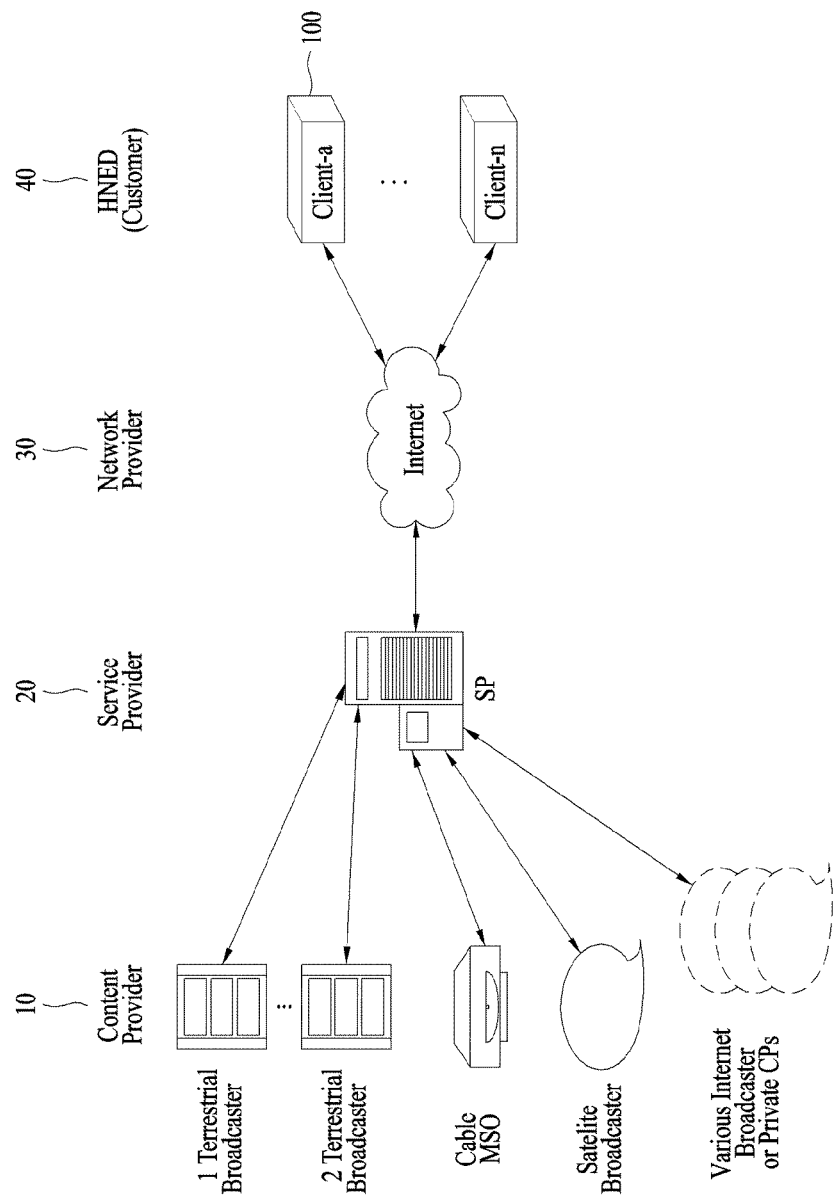

[Fig. 2]
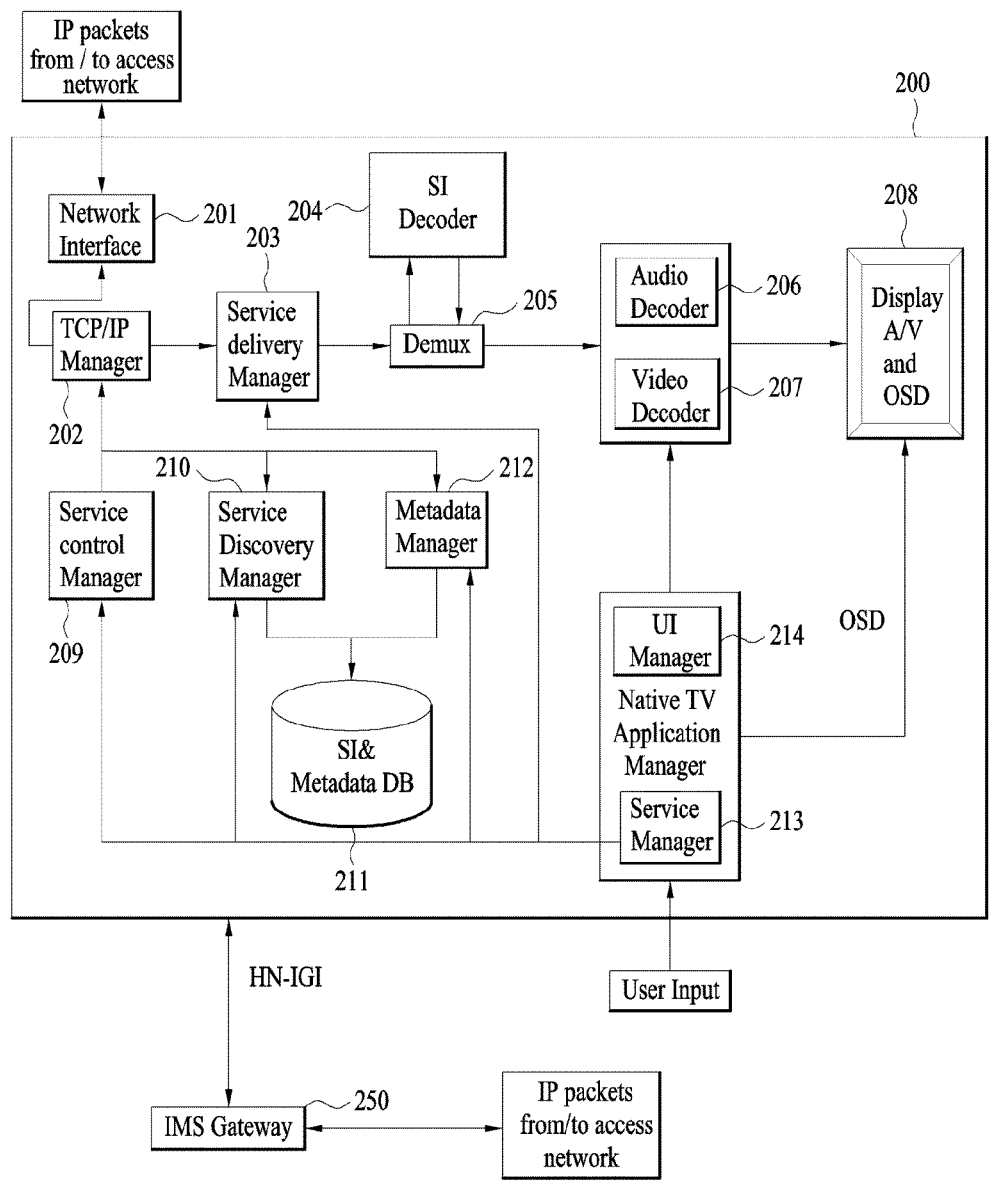

[Fig. 3]
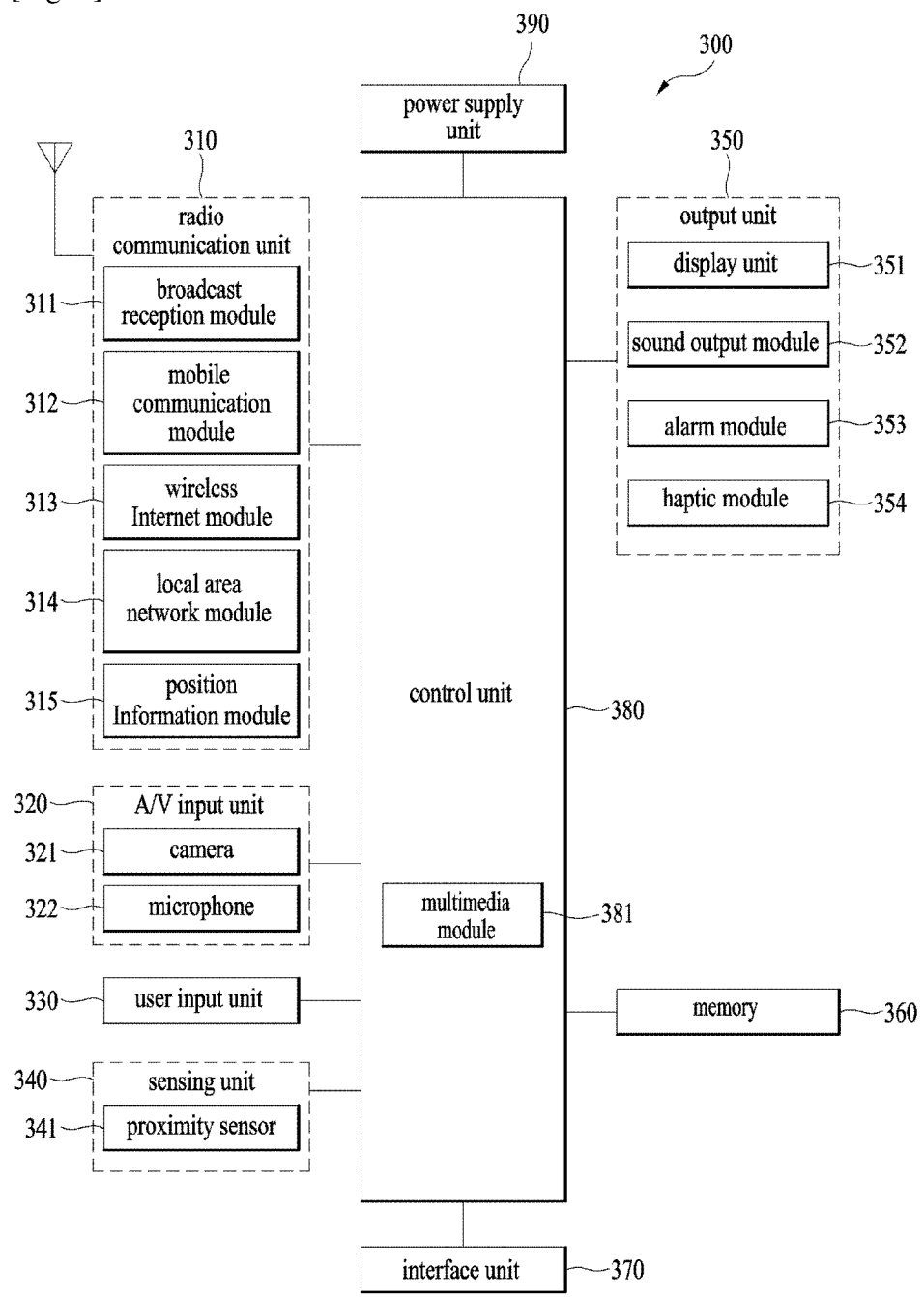

[Fig. 4]
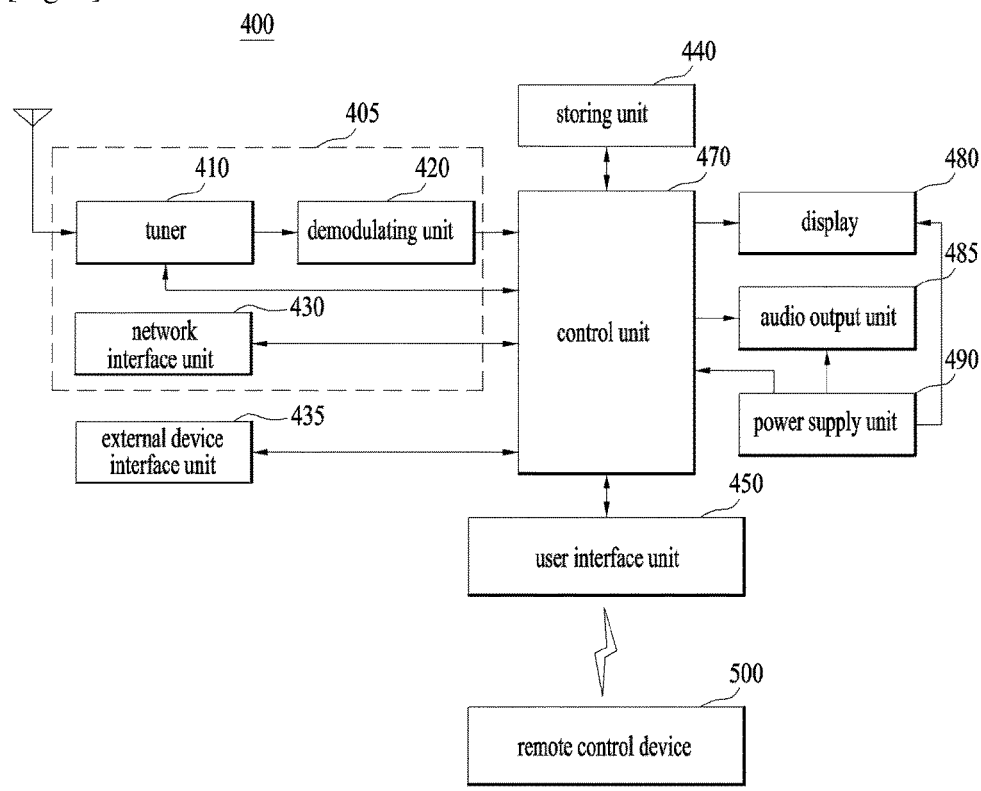
[Fig. 5]
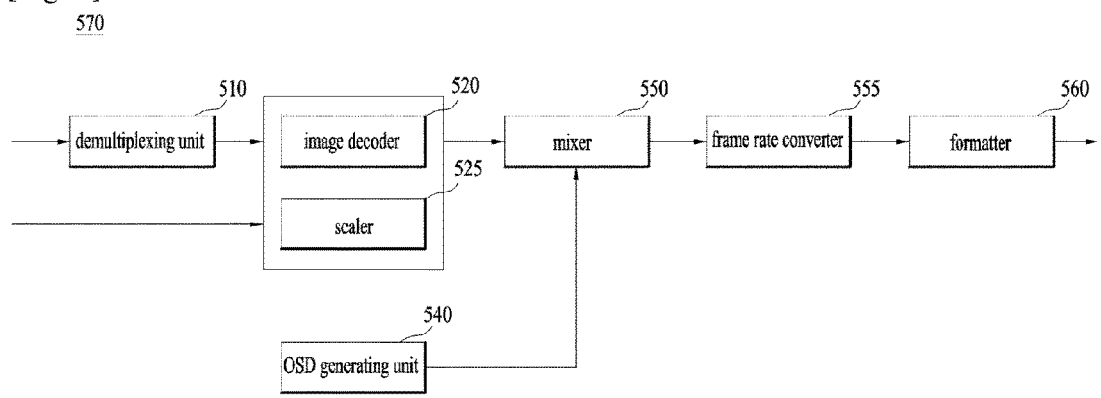

[Fig. 6]
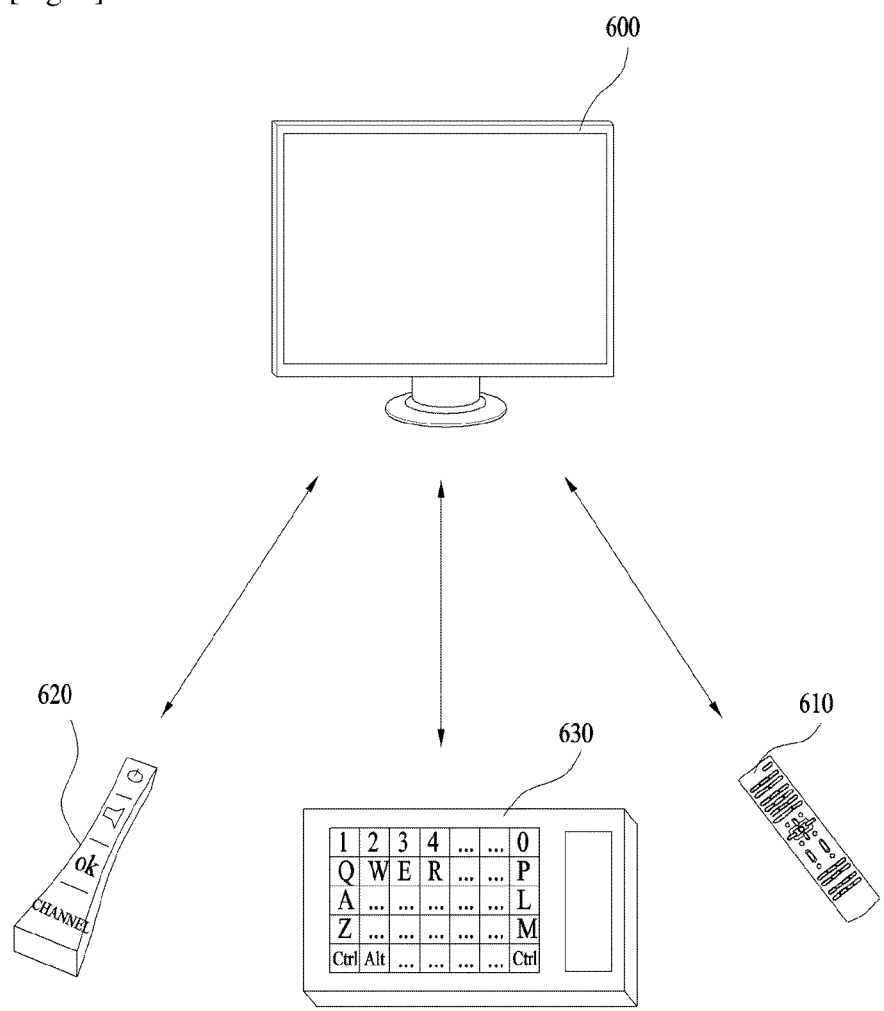

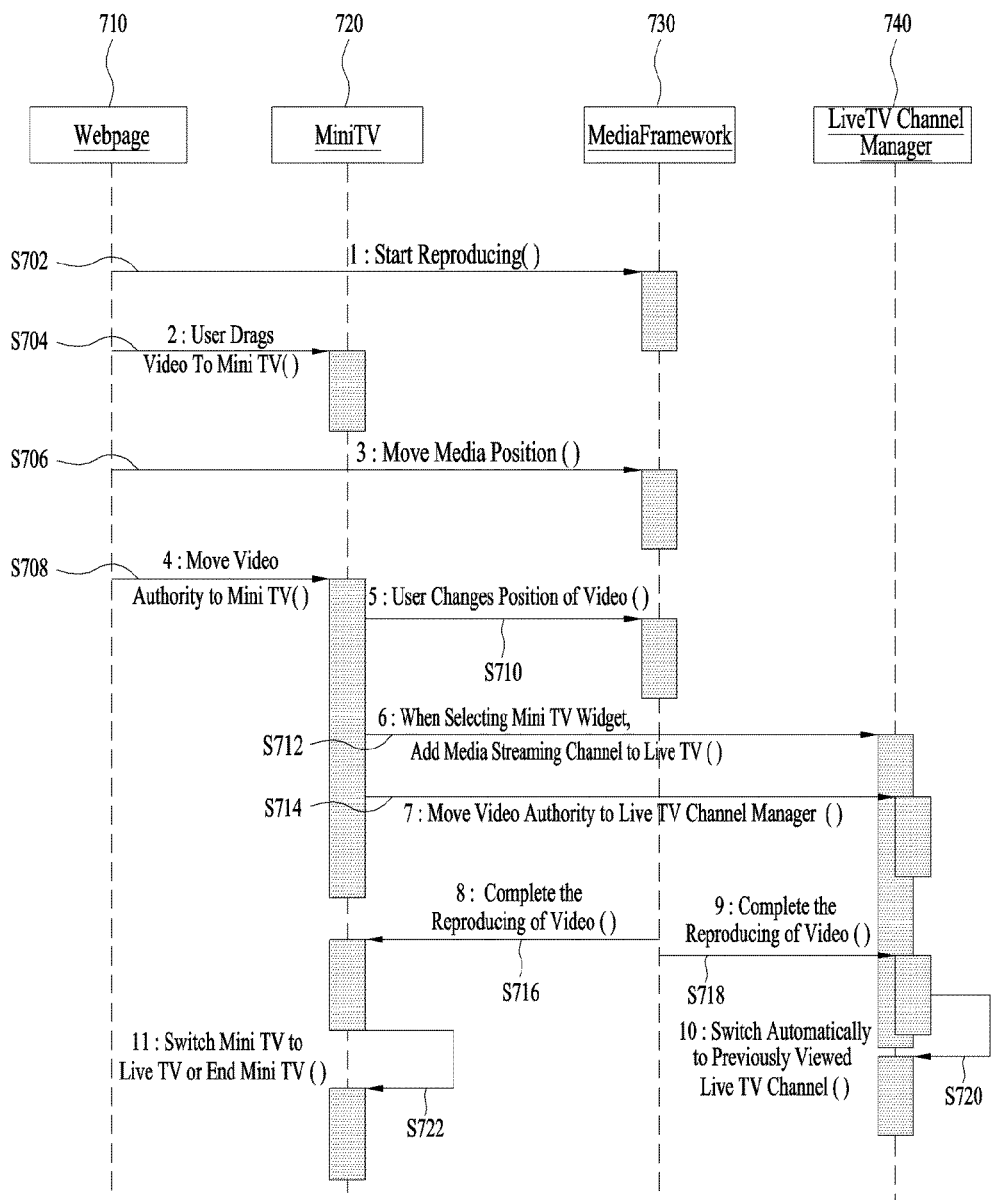

[Fig. 8]
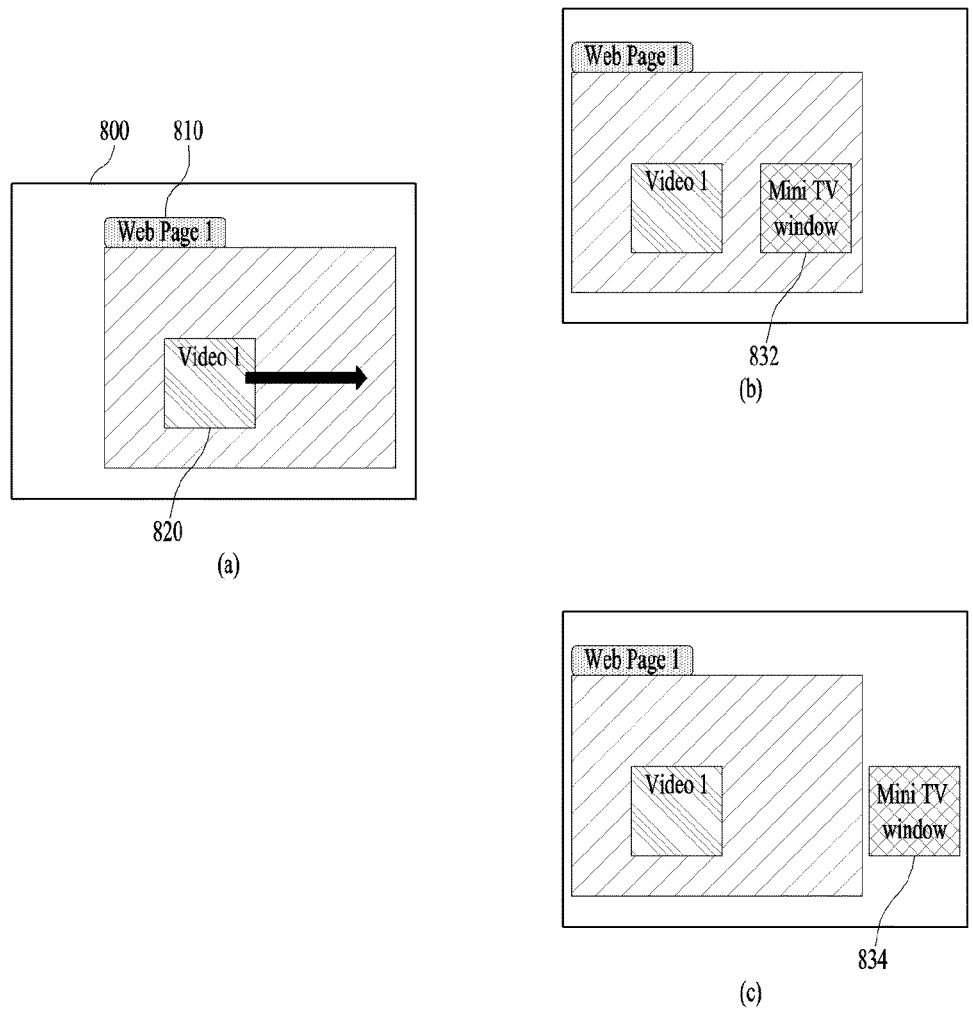

[Fig. 9]
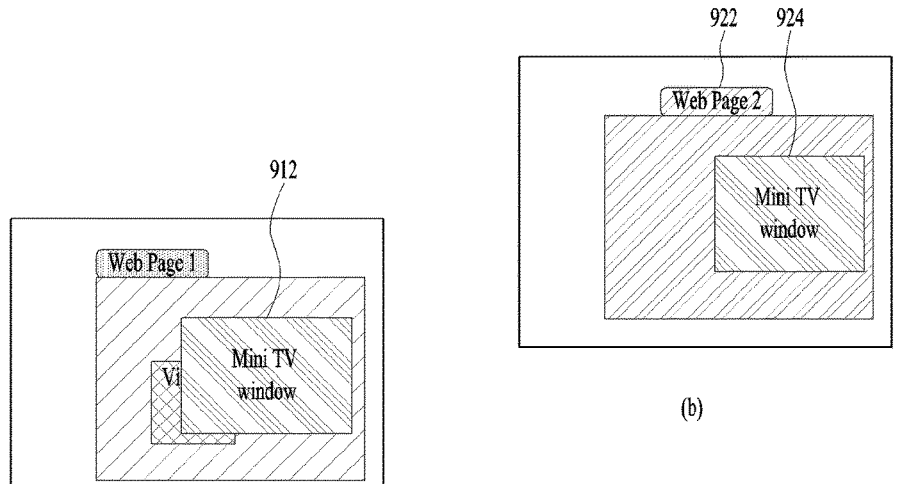
(a)
(b)
(c)
[Fig. 10]
[Fig. 11]
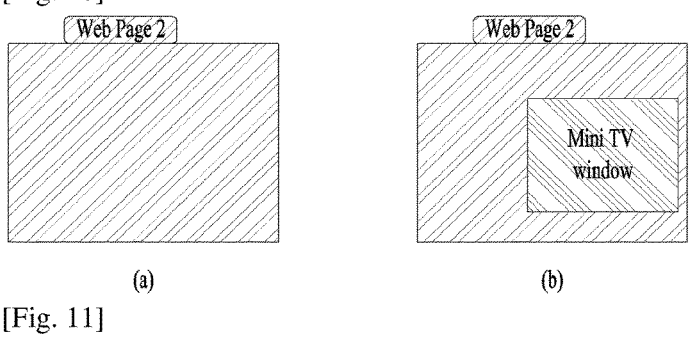
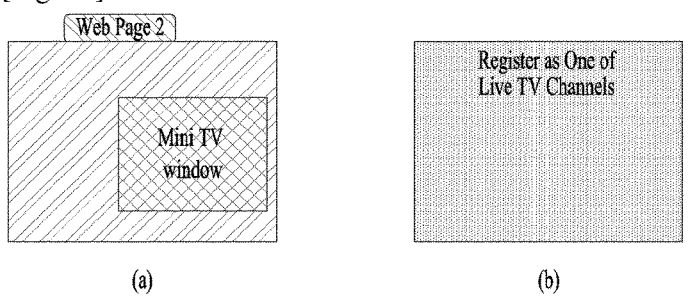

[Fig. 12]
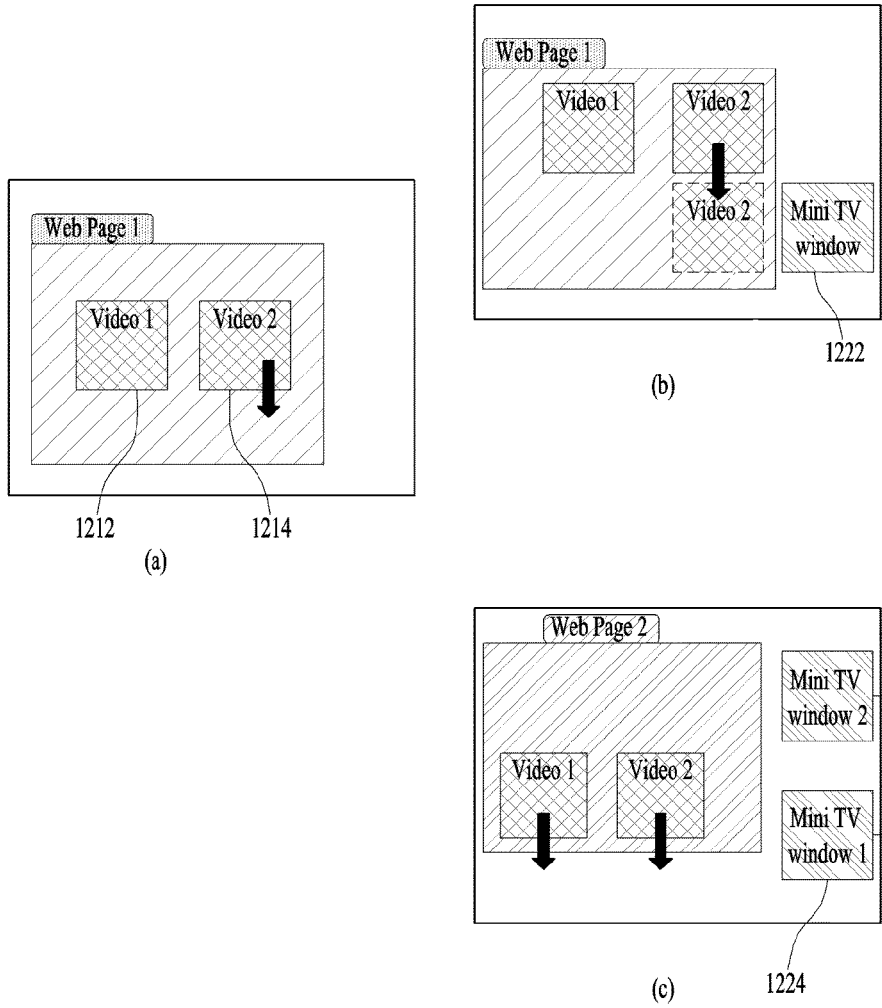
[Fig. 13]
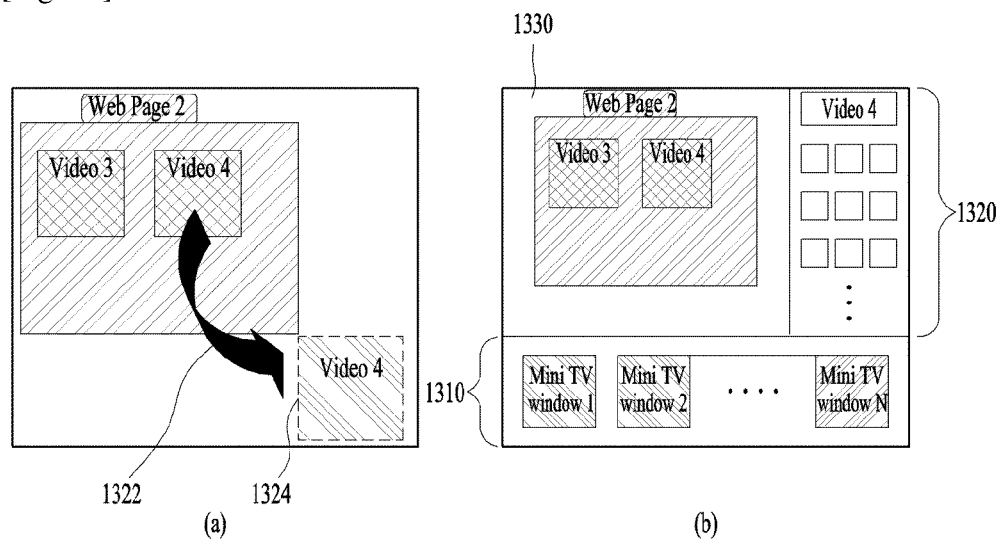

[Fig. 14]
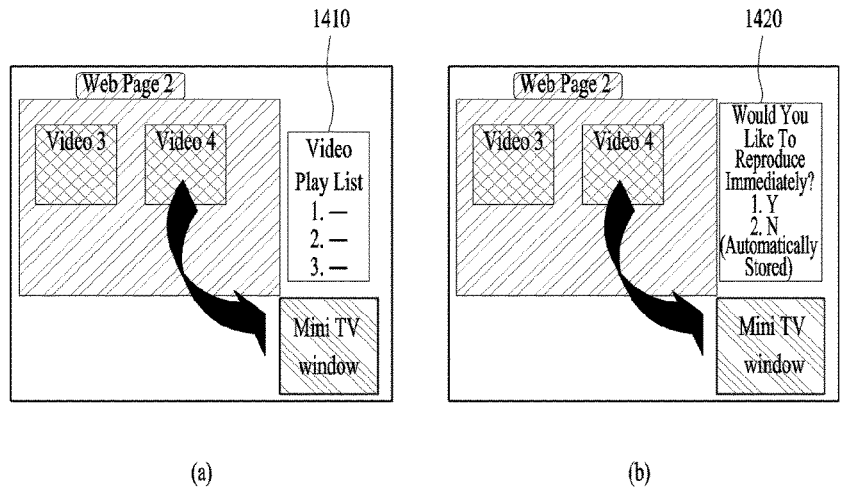
(a)          (b)
[Fig. 15]
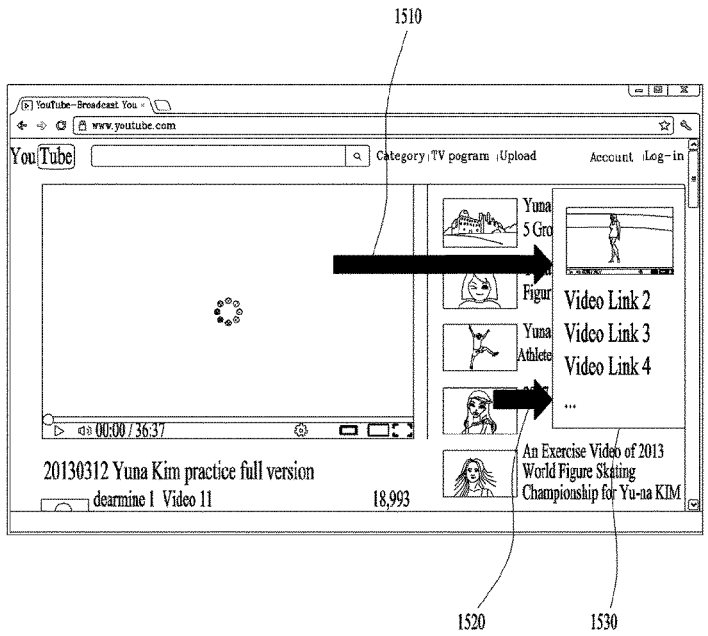
[Fig. 16]
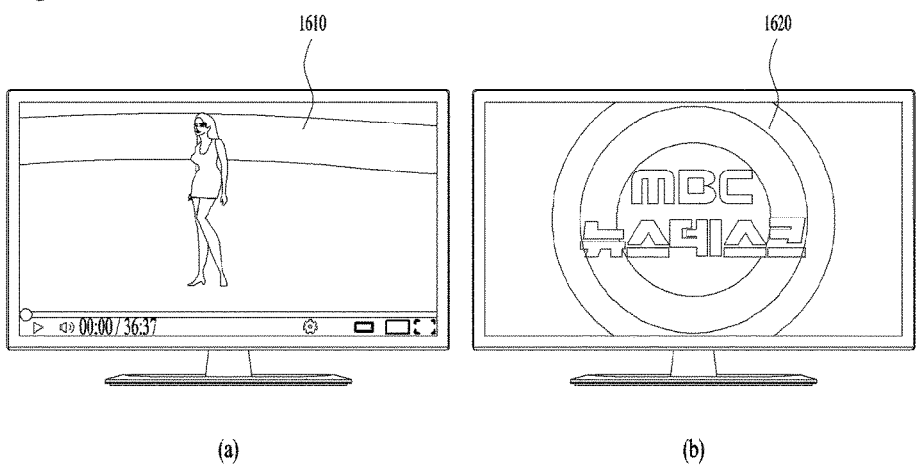
(a)          (b)

[Fig. 17]
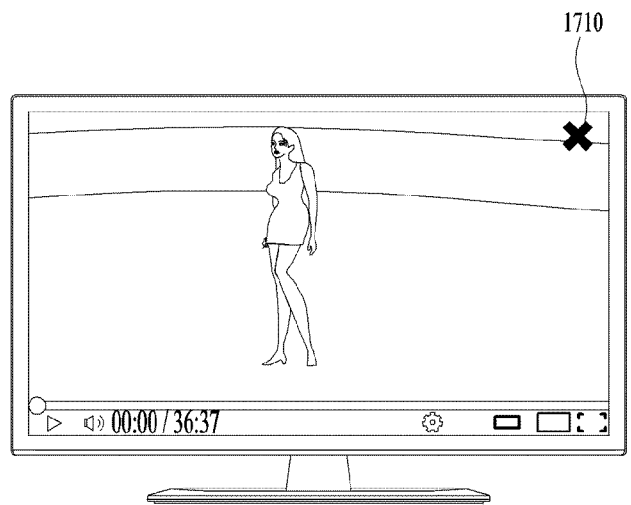
[Fig. 18]
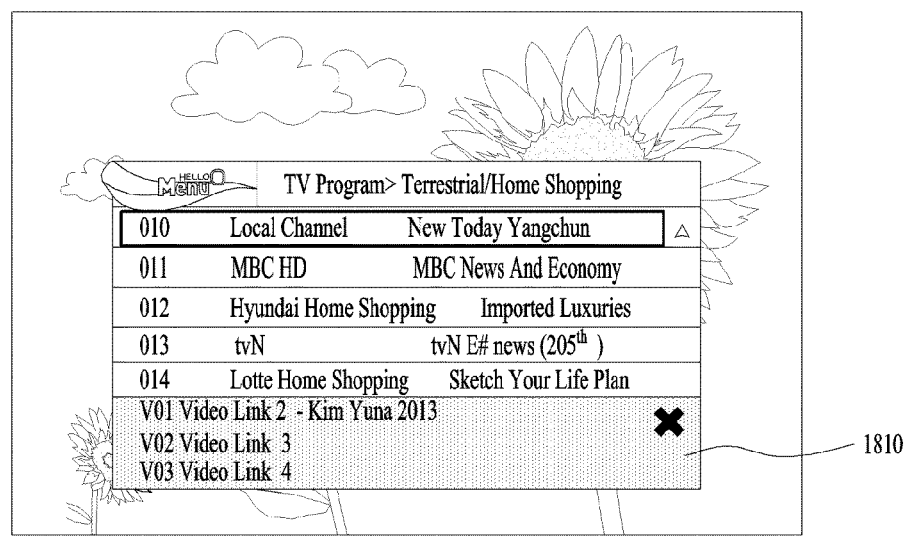

[Fig. 19]
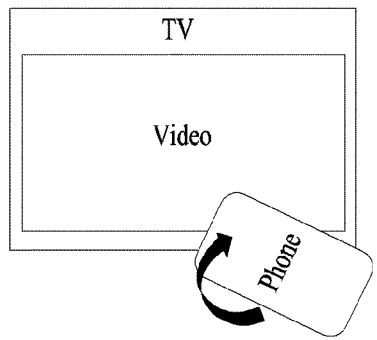
(a)
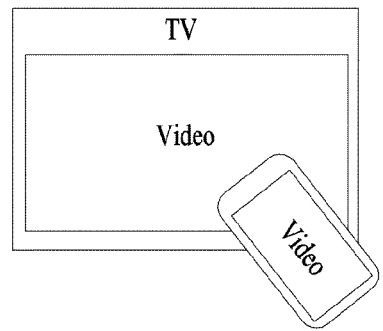
(b)
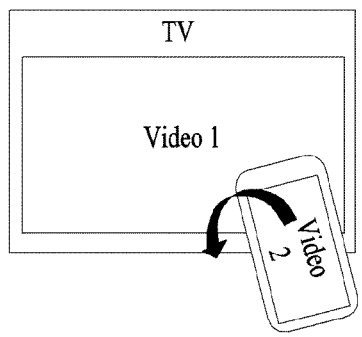
(c)
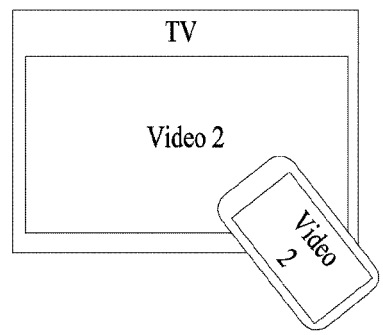
(d)

[Fig. 20]
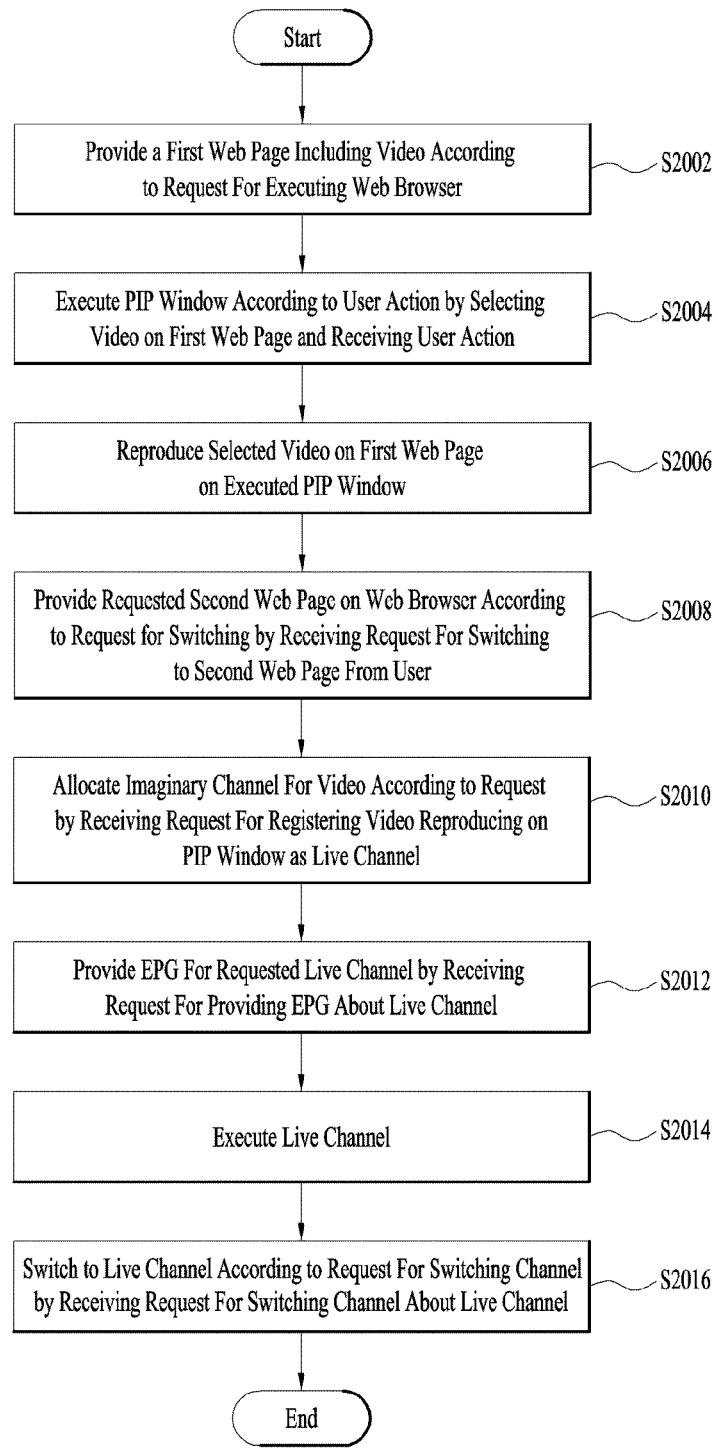

DIGITAL DEVICE AND METHOD OF PROCESSING SERVICE DATA THEREOF

CROSS-REFERENCE TO RELATED PATENT APPLICATIONS

This application is a U.S. National Stage Application under 35 U.S.C. § 371 of PCT Application No. PCT/KR2014/005732, filed Jun. 27, 2014, which claims priority to Korean Patent Application No. 10-2013-0075732, filed Jun. 28, 2013, whose entire disclosures are hereby incorporated by reference.

TECHNICAL FIELD

This disclosure relates to a digital device and a method for processing service data thereof, and more particularly to a method for processing an element of all elements included in a content or service outputted on a screen of a digital device or an area of a total area output the content in the screen, and the digital device thereof.

BACKGROUND ART

Digital broadcasting, compared to the conventional analog broadcasting, has advantages in data loss reduction and in error corrections due to the strength in white noises. Furthermore, it can provide not only clear images but also bi-directional services because high resolution can be realized.

The digital broadcasting provides not only the conventional terrestrial, satellite, and cable services but also, recently, services such as real-time broadcasting and CoD (Contents on Demand) for digital contents through IP (Internet Protocol) network.

On the other hand, more various services are available by connecting IP to the digital TV, and, for example, web services provided in the conventional PC (Personal Computer) can be provided in the digital TV.

The reproducing of media on a web browser of the digital TV is mainly performed in flash-based web services such as YouTube and a streaming service can be provided through a portal site.

However, it is not possible to independently separate and control elements of a conventional web page, which are composed of as a content in its entirety. Thus, when, in the digital TV, a user views a video clip on the web page through the web browser, it can not be change the web page to a different web page while the video clip is viewed. Thus, the user must complete or terminate viewing the video clip and then can move to a different web page. Or, the video clip must be terminated by changing the web page to the different web page or generating the different web page in the digital TV.

DISCLOSURE OF INVENTION

Technical Problem

An object of the present disclosure is to provide an advanced or intelligent service (hereinafter, 'IS'), which meets a user intention or needs, that provides a service or a content on a screen of a digital device.

Another object of the present disclosure is to provide an advanced or intelligent web service (hereinafter, 'IWS') which meets a user's intention or needs, as one of the intelligent services, through a web browser in a digital device.

Another object of the present disclosure is to select one of elements included in (or of) a service or content, or separate at least one desired element from the other elements of the service and content or separately process and/or control it.

Another object of the present disclosure is to separate and process a video included in a web page from the corresponding web page.

Another object of the present disclosure is to not only provide a web service for outputting a different web page with a video separated from a web page but also output or/and simultaneously control a different service and content unrelated to the web service with the video separated from the web page.

Another object of the present disclosure is to improve users' satisfaction and minimize inconvenience by providing a user-friendly service that meets the user's needs, intention or requests through the IS that includes the IWS.

Solution to Problem

In the present disclosure, various embodiments of a digital device and a method of processing service data thereof are disclosed.

An embodiment of the method for processing service data in the digital device includes executing a web browser and outputting providing a first web page including a first video through the executed web browser; receiving a first user action, the first user action requesting to select the first video included in the first web page and a user action; and outputting a picture-in-picture (PIP) window reproducing the first video included in the first web page on the screen according to the user action; and reproducing the video of the first web page via the outputted PIP window providing a first web page including a video according to a request for executing a web browser; selecting the video on the first web page and receiving a predetermined user action; executing a PIP window according to the selection and the user action; and reproducing the selected video of the first web page on the executed PIP window.

On the other hand, an embodiment of the digital device includes a receiver receiving a broadcast signal which contains a content and signaling information including channel information by tuning a channel, a user interface receiving a request for executing a web browser and a first user action requesting to select a first video included in a first web page through the executed web browser, a controller controlling to execute the web browser, output a first web page including the first video according to the request, output a picture-in-picture (PIP) window reproducing the first video included in the first web page on the screen according to the user action, and an output unit outputting the web browser outputting the first web page and the PIP window a digital device for processing service data includes a receiver receiving a signal for a broadcasting channel; a user interface receiving a request for executing a web browser from the user; a controller providing a first web page including a video according to the request, executing a PIP window according to a selection of the video of the first web page and a predetermined user action, and reproducing the selected video of the first web page on the executed PIP window; and an output unit outputting the web browser, the PIP window, and the broadcasting channel.

Advantageous Effects of Invention

According to the present disclosure:

First, the present disclosure has an effect that an advanced or intelligent service, which meets a user's intention or needs, that provides a service or content provided on the screen of a digital device can be provided.

Second, the present disclosure has an effect that an advanced or intelligent web service that meets a user's intention or needs through a web browser in a digital device can be provided.

Third, the present disclosure has an effect that one of elements included in a service or content can be selected, or at least one desired element can be separated from the other elements of the service and content or separately processed and/or controlled.

Fourth, the present disclosure has an effect that a video included in a web page provided through a web browser from the web page can be separated and processed/controlled.

Fifth, the present disclosure has an effect that not only a web service that offers to a different web page with a video separated from a web page can be provided, but also a different service and content unrelated to the web service with the video separated from the web page can be outputted or/and simultaneously controlled.

Sixth, the present disclosure has an effect that users' satisfaction can be improved and inconvenience can be minimized by providing a user-friendly service that meets the user's needs, intention or requests through the IS that includes the IWS.

BRIEF DESCRIPTION OF DRAWINGS

FIG. 1 illustrates a block diagram for an embodiment of a service system including a digital device;

FIG. 2 illustrates a block diagram for an embodiment of a digital device;

FIG. 3 illustrates a block diagram for another embodiment of a digital device;

FIG. 4 illustrates a block diagram for another embodiment of a digital device;

FIG. 5 illustrates a block diagram for an embodiment of a detailed configuration of controllers of FIG. 2. to FIG. 4;

FIG. 6 illustrates a drawing of digital devices of FIGS. 2 to 4 and a controlling means of the digital devices;

FIG. 7 illustrates a flowchart of an embodiment of a method of processing an Intelligent Web Service (IWS) using a mini-TV module;

FIGS. 8 to 11 illustrate various embodiments of a procedure of processing the Intelligent Web Service (IWS) and its usage scenario;

FIGS. 12 to 14 illustrate a procedure of processing a plurality of videos on one web page;

FIG. 15 illustrates a procedure of processing a plurality of videos existing as a main video and a substitute video on one web page;

FIGS. 16 to 18 illustrate an Intelligent Service (IS) process when a channel in broadcasting channels is changed;

FIG. 19 illustrates an Intelligent Service control through a mobile digital device; and FIG. 20 illustrates a flowchart for explaining a method of processing service data in a digital device.

BEST MODE FOR CARRYING OUT THE INVENTION

In the following, with reference to the drawings, various embodiments according to the present disclosure will be described in detail.

In the following description, the ending words for the configured elements such as "module" and "unit" are simply used for the purposes of easier explanation and they do not have special meanings or roles. Thus, the words, "module" and "unit", can be interchangeably used. Also, in case of numbering words such as "the first" and "the second", they are not meant to be ordered but simply used for the purposes of easier explanation. Therefore, they are not limited to the words or the numbering order.

Also, although general terms, which are widely used considering functions in the present disclosure, have been selected in the present disclosure, they may be changed depending on intention of those skilled in the art, practices, or new technology. Therefore, it is to be understood that the terms should be defined based upon their meaning not their simple title and the whole description of the present disclosure.

Referring to the attached drawings and the description, various embodiment(s) can be further described as follows. The present specification or/and drawings are not limited to the described embodiments and the scope of its right should be determined by its claims.

For example, digital device described in the present disclosure includes all digital devices that can perform at least one of transmitting, receiving, processing, and outputting data, contents, and services. Such digital devices transmit and receive data by pairing or connecting with other digital device(s), external server(s), and the like, through wired/wireless network(s), and perform converting if necessary.

For example, the digital device includes not only standing devices such as a network TV, a HBBTV (Hybrid Broadcast Broadband TV), a Smart TV, an IPTV (Internet Protocol TV), a PC (Personal Computer), and the like but also mobile devices or handheld devices such as a PDA (Personal Digital Assistant), a Smart Phone, a Tablet PC, and a Laptop, and the like. In the present disclosure, a digital TV in FIG. 2 and a mobile device in FIG. 3 are shown and explained as embodiments of the digital device.

On the other hand, the wired/wireless network described in the present disclosure is referred as a communication network connecting digital devices or a digital device with an external server or/and supporting various communication standards and protocols for data communication (i.e., data transmission and reception). Such wired/wireless network includes communication networks that are supported currently or in future by the standard and communication protocols for them. For example, such network can be supported by communication standards and protocols for wired connection such as a USB (Universal Serial Bus), CVBS (Composite Video Banking Sync), Components, S-video (analog), DVI (Digital Visual Interface), HDMI (High Definition Multimedia Interface), RGB, D-SUB, and the like, and communication standards for wireless connection such as Bluetooth, RFID (Radio Frequency Identification), IrDA (Infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE (Long Tern Evolution), Wi-Fi Direct, and the like.

If a digital device is merely referred in the present disclosure below, it means the standing device or the mobile device depending on context and it means both.

For example, a digital device supports an e-mail, a web browsing, banking, game, application, and the like, through the wired/wireless networks as an intelligent device supporting at least one of external inputs such as a broadcast receiving function and computer function. Moreover, the digital device is equipped with an interface to support at least one of an input or control means (hereinafter, 'input means') such as a pen-inputting device, touch screen, and motion remote controller. The digital device utilizes a standardized OS (Operating System). Thus, the digital device can add, delete, amend, and update various applications based on the OS and can provide more user-friendly conditions by doing so.

Also, the external input, which means an external input device, described in the present disclosure includes all input means and digital device(s) that are wired/wirelessly connected with the digital device and process related data by transmitting/receiving through them. Here, the external input includes all digital devices such as a HDMI (High Definition Multimedia Interface), Play Station, X-box, smart phone, tablet PC, printer, and smart TV, and the like.

Also, a server described in the present disclosure, which is a client, supplies data to the digital device and is also referred as a processor. Such the server includes, for example, a portal server providing web contents and/or web pages, an advertizing server providing advertizing data, a content server providing contents, a SNS (Social Networking Service) server providing SNS data, and a service server or manufacturing server provided by manufacturers of the digital device.

An example of a channel described in the present disclosure can be such a broadcasting channel meaning a path or a means for transmission/reception. Here, the broadcasting channel is expressed by terms such as a physical channel, a virtual channel, and a logical channel. As such, as the broadcasting channel is broadcasting contents provided by a broadcasting station or a channel to advance to a receiver, the broadcasting contents are referred as a live channel because the broadcasting contents are based on real-time broadcasting. However, since medium for broadcasting have become more diverse and non-real time broadcasting besides real time broadcasting has become also active, the live channels can mean not only real time broadcasting but also all broadcasting channels including non-real time broadcasting.

In the present disclosure, an arbitrary channel is further defined or specified regarding channels besides the broadcasting channels. The arbitrary channel can be identified or represented through service guides such as an EPG (Electronic Program Guide) with a broadcasting channel. At least one of the service guide, a GUI (Graphic User Interface) and OSD screen (On-Screen Display screen) only for the arbitrary channel can be provided on a screen of the digital device.

Here, the arbitrary channel is defined such a physical channel or a virtual channel. Unlike the broadcasting channels that have predetermined channel numbers between the transmitter and the receiver, an arbitrary channel is an arbitrarily allocated channel in the receiver and does not overlap with channels indicating the broadcasting channels. For example, when the receiver tunes a broadcasting channel, it receives a broadcast signal that carries the broadcasting content and the signaling information for the broadcasting content through the tuned channel. Here, the receiver parses channel information from the signaling information and provides a user with a channel browser, EPG, and the like, based on the parsed channel information. When the user requests for changing a channel through the inputting means, the receiver corresponds to the request.

As such, since the broadcasting channels are a predetermined promise between the transmitter and the receiver, the users may be confused if an arbitrary channel and a broadcasting channel are allocated in an overlapping channel. Therefore, it is appropriate not to allocate the arbitrary channel to an overlapping channel with the broadcasting channel as mentioned above. On the other hand, although an overlapping channel is not allocated to the arbitrary channel with the broadcasting channel as mentioned above, there is still possible confusion while the user's channel surfing. Therefore, the arbitrary channel number should be allocated by taking that concern into consideration. It is because the arbitrary channel according to the present disclosure can be realized by the same method as the broadcasting channel in that the user requests for channel switching through the input means. Therefore, the arbitrary channel number can be defined and displayed as Arbitrary channel-1 or Arbitrary channel-2 unlike numeral broadcasting channels in order for the user to advance to the arbitrary channels more easily and in order to distinguish the arbitrary channels and the broadcasting channels more easily. On the other hand, in this case, although the arbitrary channel is displayed as Arbitrary channel-1, it can be recognized and realized as a number like the broadcasting channel inside the receiver. The arbitrary channel number can be provided as a number like the broadcasting channel and can be defined and displayed in various ways such as Video channel-1, Title-1, Video-1, and the like.

For example, the digital device provides users web pages by executing web browsers for web services. Here, the web page includes a video and the video is individually or independently separated and processed from the web page in the present disclosure. And, the separated video content is allocated an arbitrary channel number, provided through the service guide, and outputted according to the user's channel changing or switching request while the user views the service guides or broadcasting channels. Moreover, besides the web service, a content, image, video, audio, category, item and the like included in broadcasting contents, game, applications and the like, can be individually separated and processed from the broadcasting contents, game, applications, and the like. For its reproducing and processing, an arbitrary channel is allocated as mentioned above. Here, the above-mentioned method can be also applied to an area selected from a total area (such as, a video window) for outputting the broadcasting contents, game, applications and the like, in the screen.

More detailed description of the present disclosure is as follows in reference with the attached drawings.

FIG. 1 illustrates a broadcast system including a digital device according to an embodiment of the present invention.

Referring to FIG. 1, examples of a broadcast system comprising a digital device may include a content provider (CP) 10, a service provider (SP) 20, a network provider (NP) 30, and a home network end user (HNED) (Customer) 40. The HNED 40 includes a client 100, that is, a digital device.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

FIG. 2 is a schematic diagram of a digital device 200 according to an embodiment of the present invention. The digital device 200 may correspond to the client 100 shown in FIG. 1.

The digital device includes a receiver receiving a broadcast signal which contains a content and signaling information including channel information by tuning a channel, a user interface receiving a request for executing a web browser and a first user action requesting to select a first video included in a first web page through the executed web browser, a controller controlling to execute the web browser, output a first web page including the first video according to the request, output a picture-in-picture (PIP) window reproducing the first video included in the first web page on the screen according to the user action, and an output unit outputting the web browser outputting the first web page and the PIP window a digital device for processing service data includes a receiver receiving a signal for a broadcasting channel, a user interface receiving a request for executing a web browser from the user, a controller providing a first web page including a video according to the request, executing a PIP window according to a selection of the video of the first web page and a predetermined user action, and reproducing the selected video of the first web page on the executed PIP window and an output unit outputting the web browser, the PIP window, and the broadcasting channel.

The digital device 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital device 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital device 200 may provide a service (for example, SNS) through an image on the screen, the digital device 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital device 200 can store data, related with a service and input by the user during the service, in the memory in a similar manner such that the data is used to configure the service and, if required, process the data into a form required for another digital device and transmit the processed data to the other digital device or a related service server.

In addition, the application manager, the controller or the digital device can control information or an action corresponding to a request of the user to be executed when the user makes the request while using the SNS. For example, when the user selects input data of another user or a region corresponding to the input data while using the SNS, the application manager, the controller or the digital device may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital device.

When the user moves the first result (e.g. image data) to a broadcast program or broadcast service output area through drag & drop, the digital device can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital device can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital device can determine and store coordinate information about the displayed service and/or OSD. Accordingly, the digital device can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

FIG. 4 illustrates a digital device according to another embodiment of the present invention.

Referring to FIG. 4, an exemplary digital device 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital device 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital device 400 to wired/wireless networks.

Using the network interface 430, the digital device can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital device 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital device 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or backpressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital device 300. For example, the controller 470 can control the tuner 410 to tune to an RF broadcast corresponding to a channel selected by the user or a previously stored channel.

The controller 470 can control the digital device 400 according to a user command input through the user input interface 450 or an internal program. Particularly, the controller 470 can control the digital device 400 to be linked to a network to download an application or application list that the user desires to the digital device 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital device 400, received broadcast content, or content input from an external device. The content may include at least one of a broadcast image, an external input image, an audio file, a still image, an image of a linked web, and a text file.

The controller 470 can control display of applications or an application list, downloadable from the digital device 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital device 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital device 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450. The digital device 400 may further include the photographing unit (not shown) for photographing the user. Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital device 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital devices shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital device according to the present invention may not include the tuner and the demodulator, differently from the digital devices shown in FIGS. 2 and 4, and may receive content through the network interface or the external device interface and reproduce the content.

The digital device is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

FIG. 5 illustrates a digital device according to another embodiment of the present invention. Particularly, FIG. 5 shows a configuration for implementing a 3D digital device, which can be included in the configurations of FIGS. 2 and 3.

The digital device according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital device, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals. Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

On the other hand, the aforementioned digital device is a mere embodiment according to the present disclosure and each element of the digital device can be combined, added, or deleted according to the specification of the digital device. That is, if necessary, more than two elements can be combined as one element or one element can be split in two elements. Also, functions performing in each block are merely to explain the embodiments of the present disclosure and the scope of the present disclosure is not limited to the detailed operations or the devices.

On the other hand, the digital device can be a video signal processing device that performs signal-processing of video stored or inputted in the device. Another example of the video-signal processing device can be a set-top box (STB) excluding the display unit 480 and an audio output 485 shown in FIG. 4, the aforementioned DVD player, a blu-ray player, a game console, and a computer.

FIG. 6 shows a drawing of a controlling means of the digital devices in FIGS. 2 to 4 and the digital devices.

A front panel (not shown) included in a digital device 600 or a controlling means are used to control the digital device 600.

On the other hand, the controlling means can include a remote controller 610, a keyboard 630, a pointing device 620, and a touchpad for the purpose of controlling the digital device 600 as a wired/wireless communication user interface device (UID), and can also include a controlling means for external inputs connected to the digital device 600. Moreover, the controlling means can include mobile devices such as a smart phone and a tablet PC that control the digital device 600 by changing the mode although it is not for controlling the digital device 600. However, the present disclosure shows the pointing device as an embodiment for easier explanation and it is not limited to that.

The controlling means can communicate with the digital device by using at least one of RS communication protocols such as Bluetooth, RFID (Radio Frequency Identification), IrDA (Infrared Data Association), UWB (Ultra Wideband), ZigBee, and DLNA (Digital Living Network Alliance).

The remote controller 610 is a conventional controlling means that include various key buttons necessary for controlling the digital device 600.

The pointing device 620 is equipped with a Gyro Sensor and transmits a predetermined control command to the digital device 600 by realizing the pointing device 620 corresponding to the screen of the digital device 600 based on the user's motion, pressure, and rotation. Such pointing device 620 can be named as various names such as a magic remote controller and a magic controller.

The keyboard 630 not only provides a function of offering conventional broadcasting through the digital device 600 but also behaves like a PC keyboard for typing texts more easily as a total digital intelligent device which provides various services such as a web browser, an application, and a Social Network Service (SNS). This is to improve the conventional remote controller 610 that cannot perform such functions.

On the other hand, the controlling means such as the remote controller 610, the pointing device 620, and the keyboard 630 can be used for various purposes such as inputting texts, moving the pointing device, maximizing/minimizing images and video clips by having a touchpad, if necessary.

In the following, an intelligent web service that meets the user's intention and needs and provides services or contents through the screen of the digital device in the service system is further described by referring to the drawings. Herein, in the present disclosure, an the intelligent service is explained as an embodiment that provides a web service that meets the user's intention and needs through a web browser in the digital device. Thus, the intelligent service includes an intelligent web service.

The intelligent service independently separates and processes a portion of the content (or service) (hereinafter, 'content') from the content. Here, the portion of the content means a portion that corresponds to the user's request and that, for example, when elements of the content are plural, it is at least one of the elements, a portion (i.e., an area) of the screen outputting the content and the browser. Thus, the intelligent service described in the present disclosure is to provide user friendliness by providing the intelligent service which processes a unit of the content into a smaller unit of meaningful data than the unit of the content according to the user's request and intention.

As above-mentioned, the example of the web service is further described by referring to the drawings.

A web service, that is, a service providing a web page, being provided through a web browser in the digital device is different from a web service being provided in a PC or is limited. Here, the intelligent web service helps the web service in the digital device and is to provide better service, and when the web page includes text data (or text area) and video data (or video area), the video data is independently separated and processed from the web page.

Thus, according to the present invention, the user watches continuously a video in his interest on the web page in the digital device and simultaneously accesses to a new web page (another web page). Also, in the case of a plurality of video clips on a single web page, each video clip is independently and partially processed and simultaneously reproduced based on the intelligent web service. More detailed explanation is as follows in the corresponding sections below.

In the present disclosure, a concept or a tool used to realize an Intelligent Web Service (IWS) is referred as a mini-TV. And, data like area and element independently separated from the content can be processed (i.e., reproduced, etc), through other digital devices which are paired or connected to the digital device if necessary. However, it is not limited to the referred terminologies. In the meantime, the mini-TV can be realized in various concepts or types such as hardware, software, application, and module. However, it will be referred as a mini-TV module below for the purpose of convenience.

FIG. 7 illustrates a drawing for explaining an embodiment of the intelligent web service (IWS) based on the mini-TV module.

Referring to FIG. 7, the intelligent web service (IWS) can be implemented by using four modules.

Here, the four modules include a web page module, a mini-TV module, a media framework module, and a channel manager module. However, it is only to help understand various embodiments described in the present disclosure and the present disclosure is not only limited to those modules. Thus, more contents necessary for implementing the intelligent web service (IWS) can be added or vice versa.

When a power of the digital device is on, the digital device outputs an initial screen or initial page. Here, when the digital device is a TV, the initial screen can be a default screen like a broadcast program that is presently tuned or the initial page of a web page through an executed web browser. Here, such initial screen can be determined at least one of device type, predetermined setting and a content reproduced or a channel tuned before a power-off of the digital device.

On the other hand, after the initial screen is output on the screen of the digital device, the user can request for performing a channel change, web browser execution, and application like a game through input means shown in FIG. 6. Here, it is assumed that the user requests for executing a web browser through a motion remote controller.

When the user requests for the web browser execution, the digital device executes the web browser, requests for information about the web page (including an initial page) to a connected server, and outputs the corresponding web page on the screen through the web browser.

The web page includes at least one of text, image, audio, and video (moving picture) data. In the present disclosure, said text, image, audio, and video data included in the web page are referred and described as an element, respectively. Moreover, the element of the web page is not limited to a specific format or type, include all data for the web page. Especially, the element can mean separately, discernibly, or independently processed data or data unit.

When the video included in the output web page is reproduced, the web page module 710 reports to the media framework module 730 that the video has been reproduced (S702).

And, the user selects a video element included in (or of) the output web page and accesses by a predetermined method and the mini-TV module 720 is executed (S704). Here, there can be various methods for accessing to the video element and the drag & drop method for the selected video element is used by using the motion remote controller in the present disclosure.

Then, at least one of the web page module 710 and the mini-TV module 720 reports to the media framework module 730 about accessing to the video element included in the web page, for example, the movement of the media position (S706). Here, the movement of the media position means that the position of a window for outputting the media that reproduces the video element changes. For example, as below, the video element is output on the web page at first but can be later output by the mini-TV module 720. This means that the video element is output via a PIP (Picture inn Picture) window which is linked to the mini-TV 720.

If the media position is changed, the web page module 710 passes the control authority of the video element to the mini-TV module 720 (S708).

The mini-TV module 720 can continue to have the control authority of the video element until the reproducing of the video is completed.

Then, for example, if the digital device receives a request for changing a position of reproducing the video, the mini-TV module 720 reports to the media framework module 730 about the information related to the request for changing the reproducing position of the video (S710).

On the other hand, the mini-TV module 720 can be output in a form of a widget and the user can move the widget to a desired position or can control at least one of a size, a resolution and a ratio for the widget in various ways.

Also, for example, video can be output through a broadcast channel screen. Here, the broadcast channel screen is a screen output for viewing broadcast program and a term "video output for on the broadcast channel screen" means that the video is processed like a broadcast program processed in the digital device. In other words, the user can view video streaming in the digital device as if he views the broadcast program via the tuned broadcasting channel.

For that, the mini-TV module 720 requests to the channel manager module 740 for adding an arbitrary channel of the media streaming to the broadcasting channels (S712) and the channel manager module 740 allocates an arbitrary channel to process the video streaming as if a broadcasting channel is tuned in order to output a broadcast program according to the adding request.

Moreover, the channel manager module 740 includes a guide such as an EPG (Electronic Program Guide), and an ESG (Electronic Service Guide) regarding the broadcasting channel with an arbitrary channel. Also, when the user selects the arbitrary channel from the guide, the arbitrary channel is immediately reproduced or accessed. Or, the arbitrary channel is accessed by channel changing (or channel switching or channel surfing) while viewing the broadcast program. Also, there can be similarly performed that one or more functions to the arbitrary channel like functions to the broadcasting channel. For example, the one or more functions to the arbitrary are followings: viewing reservation, time machine, and the like. Moreover, like the broadcasting channel, detailed information about the video of the arbitrary channel can be provided in the digital device. Here, the detailed information can be received from an external server.

Thus, like the step S712, when video is provided on the screen by channel changing, the mini-TV module 720 passes the control authority of the corresponding video to the channel manage module 740 (S714).

When the reproducing of the corresponding video is completed, the media framework module 730 reports the completion of reproducing the video to at least one of the mini-TV module 720 and the channel manager module 740 (S716/S718).

After S716/S718, the channel manager module 740 controls the automatic switching of the previously accessed broadcasting channel of the arbitrary channel or the next broadcasting channel of the arbitrary channel (S720) and the mini-TV module 720 ends the mini-TV widget or switches to the broadcast channel screen (S722). Here, the channel manager module 740 does not controls automatic switching of the previously accessed broadcasting channel or the next broadcasting channel of the arbitrary channel and can be on the stand-by for a user's input for a predetermined period of time, automatically reproduce the next video on the video play list related to the arbitrary channel, or be on the stand-by for viewing according to the user's input or set-up.

FIGS. 8 to 11 illustrate various embodiment(s) of the intelligent web service (IWS) processing procedure and use scenarios.

Referring to FIG. 8a, the digital device 800 outputs the web page 1 810 on the screen through the web browser. Here, the web page 1 includes Video 1 820 (video element).

In the FIG. 8a, when the user selects the video 1 element included in the web page 1 or an area 820 on the web page 1 through the input means, the selected video 1 element 820 is activated to change (e.g., move, etc.). When the user drags and drops the activated video 1 element in the predetermined area on the screen, the mini-TV window 832 or 834 as shown in FIG. 8b or 8c is automatically activated and outputted on the screen.

On the other hand, the "activating" means not moving the actual video but providing a predetermined shape or size of a virtual box. Such activation is, for example, to generate the mini-TV window according to the movement of the box.

Referring to FIG. 8b, the PIP window (i.e., mini-TV window) 832 can be output in the web page 1 810 on the screen. On the other hand, referring to FIG. 8c, the PIP window 834 can be output such that it is not overlapped with the web page 1 810 on the screen. Also, in FIGS. 8b and 8c, the PIP window is merely output in the predetermined area regardless of whether it is overlapped with the output web page and it could be seemingly overlapped with the output web page depending on the position of the output web page.

Here, the PIP windows 832 or 834 of FIG. 8b or 8c can be independently performed from the web page 810 after that point. Thus, the user can access a different web page and cannot be affected the video on the PIP window even if he performs any actions such as scrolling on the web page 1.

Also, when the window 832 or 834 are output, the video 1 originally reproduced on the web page 1 810 can be pause or terminated. Then, the video 1 on the window 832 or 834 can continue to be reproduced from the point that is pause or terminated on the web page 1 810. On the other hand, the pause means that it is temporarily stopped from the reproducing point and the termination means that it plays back from the initial reproducing point, that is, the starting point, regardless of the previous reproducing point. On the window 832 or 834, the video 1 in the window 832 or 834 can be started not the previous reproducing point but the starting point according to outputting the window 832 or 834.

Also, the window 832 or 834 can output immediately or automatically the video 1. Or, the window 832 or 834 can output the video 1 according to a user's action (manually) or after a predetermined period of time. That is, the video 1 can be also stored temporarily in the storage and does not be processed automatically. This is to prepare for cases where it has a communication environment trouble with the web server or video streaming lags because of too much traffic.

For the latter case, the digital device provides thumbnail images for the corresponding video on the mini-TV window 832 or 834 so that they can be selected and they can be reproduced after the thumbnail image selected by the user. Moreover, although the thumbnail images are output, the thumbnail related to the previous starting point is displayed on the mini-TV window 832 or 834 so that it can be helpful for the user's selection.

FIG. 9a illustrates an embodiment for controlling of changing the size or position of the corresponding window according to the user's request after a window 912 is executed like the step S710 of FIG. 7.

Referring to FIG. 9a, the window 912 can be output on a web page. The window 912 has a different layer from the layer of the web page. Here, the window 912 has a predetermined size and is output at a predetermined position on the screen. In this case, if the size or position of the window 912 is changed according to the user's request, the window 912 is provided such that it can be overlapped over the web page.

Referring to FIG. 9b, although the web page is changed or switched to the web page 922, the prematurely provided window 912 will be continuously output in the previous position or the previous layer. That is, despite the fact that the web page is switched, the window 924 continues to be output same and has no effect even when the video is reproduced through the window 912. But, under the circumstances, when the web page 2922 is output, the video on the window 912 is pause and can be reproduced according to the user's selection.

On the other hand, referring to FIG. 9c, when the web page 2 922 is output, the window 926 is output in a predetermined position. As such, it is to prevent the user from not intuitively seeing a portion of data of the switched web page 2 922 covered by the window 926 provided on the very upper layer as the web page is switched, as mentioned above. On the other hand, although its position and size are changed, the window interprets the user's intention according to the web page switching and can automatically adjust the position and size adoptively according to the switched web page by weighing more weight on the last action. Each size and position of both can be adjusted such that there can be no overlapping area (data-covering area). Also, FIG. 9c is another embodiment and when there is video on the web page that is to be switched, it is provided for the corresponding video's convenience or although there is a partial overlapping area like FIGS. 9a to 9b, it is provided such that the video of the switched web page can be selected.

FIGS. 8, 9 and 10a illustrate embodiments in which a window corresponding to the video that has been reproduced or completed through the window disappears, and FIG. 10b illustrates an embodiment in which the window continues to be output.

As shown in FIG. 11a, when the window is output, the digital device can allocate the aforementioned arbitrary channel to the corresponding video automatically or according to the user's request. In this case, the digital device can output the video on a broadcast channel screen which is relatively large, not the PIP-screen, by a predetermined action or request to the window, as shown in FIG. 11b. Then, although the web browser providing the web page on the background is covered by the broadcast channel screen, the web browser does not need to be ended because it can be reproduced in the PIP window type according to the user's request and in this case, it stays on to quickly access to the web service. However, it is possible that the web browser can be turned off to save power or by the user's settings.

Referring to FIG. 11b, a video can be provided through the window and an arbitrary channel can be allocated at the same time when it switches to a broadcast channel screen for later convenience. Also, the video can be resumed after the point up to which the video has been previously reproduced on the window. This is performed automatically, the user's settings or the user's request.

Also, if an arbitrary channel is not allocated for the video, the digital device can generate and output a video window list for the video. Thus, the user can access the video from the video window list and a window for the video window list can be provided on a predetermined area of the screen when the user executes the web browser in the digital device. Also, the user can perform at least one of adding the video or deleting the video, editing a list and editing video data on the window of the video window list.

FIGS. 12 to 14 illustrate embodiments for processing procedure for a plurality of video clips on the single web page. Although a plurality of video clips (video elements) on the web page are output, the fundamental procedure about its processing is similar to the one with a single video on the web page, as above-described. Thus, the overlapping explanation will be referred back and non-overlapping portion of the explanation will be described in detail.

Referring to FIG. 12a, web page 1 includes Video 1 1212 and Video 2 1214, that is, a plurality of the video clips.

If the user selects and moves Video 2 item 1214 after the Video 2 item 1214 is activated, a mini-TV window 1222 is generated and output as shown in FIG. 12b.

Here, FIG. 12b is an embodiment of accessing to the single video among a plurality of videos by the user. Here, if the user accesses to another video in a similar method as shown in FIG. 12c, windows for the videos can be sequentially provided in neighboring areas to the previous windows.

On the other hand, referring to FIG. 12c, if windows for the videos are plural, audio for the video window initially or lastly activated by the settings is provided in the speakers while audio for the rest is put in mute and can be provided in texts or images (e.g., subtitles).

Also, in FIG. 12c, the video window 1224 initially activated continues to be reproduced but later activated window videos can be sequentially reproduced in the order of the window activation. For example, in FIG. 12c, when video of window 1 is completed, then video of window 2 is to be reproduced. Or, the digital device outputs only single window and reproduces sequentially in the order of the activation via the output single window.

If a plurality of videos (Video 3 and 4) include on a single web page as shown in FIG. 13a and the user accesses to either video, a video window list including previously generated windows is provided in a first area 1310 as shown in FIG. 13b. Here, when the user selects a window, a thumbnail list for video of the selected window in a second area 1320 and/or its detailed information can be provided.

On the other hand, referring to FIG. 13b, the window for Video 4 among a plurality of windows of the first area 1310 is reproduced according to the access of FIG. 13a and the rest of the windows is stopped or pause. All windows can be reproduced, if necessary.

Also, if the user drags and drops the predetermined window of the first area 1310 or thumbnail image of the second area 1320 in a third area 1330 in FIG. 13b, the video can be switched to a full screen like the broadcast channel screen. In this case, the explanation for the arbitrary channel allocation is as mentioned above.

As above-mentioned, when switching to the full screen like the broadcast channel screen, a broadcasting program of a channel which is to be tuned is automatically provided on the PIP window and can be switched to a main screen. At this time, the main screen (e.g., arbitrary channel) can be exchanged or switched sub screen (e.g., broadcasting channel) each other in response to the user request. Also, when the user proceeds to an arbitrary channel by flipping channels up and down, the digital device processes the arbitrary channel on the PIP and can continue to provide the broadcasting channel in full screen by flipping channels. On the other hand, when the user views an arbitrary channel on a full screen and requests for a channel change, the channels changes up and down only in the arbitrary channels according to the channel change and the broadcasting channel stays on the PIP window. In this case, in order to change channels, the channel change can be performed by switching to a main/sub screen while watching the broadcast program on a full screen.

Moreover, not shown, the broadcasting channel and arbitrary channel can be equally divided and outputted on the screen according the user's request.

Also, as shown in FIG. 14a, the window can continue to provide the existing video or reproduce Video 4 by adding it to the video window list in the playing order.

Also, as shown in FIG. 14b, when Video 4 is dragged to the window, an OSD or GUI 1420 including a guide such as "Would you like to reproduce it immediately?" is output on the screen. If the user wants so, it is reproduced and if not, it is automatically stored in the video window list. Here, if the video is reproduced immediately, video that was being reproduced on the window can continue to receive stream and store it or can automatically store the corresponding URL information only. Or, it can be deleted from the video window list.

On the other hand, the storing video in the present disclosure means receiving the URL address of the corresponding video on the web page from the web server and storing it. If the user requests for the corresponding video, the stored URL address is extracted, connected, and provided on the window in the streaming method.

Also, the URL address is received from the web server and can be immediately reproduced according to the user's request after downloading it in RT (Real-Time) or NRT (Non-Real Time) and storing it.

When the window is activated and is not to be reproduced immediately after receiving the URL address for the video, on or more representative thumbnail images from the corresponding URL address with the URL address or thumbnail images for a predetermined period of time are first received and can be stored with the URL address.

FIG. 15 illustrates an embodiment of a plurality of videos on a single web page like FIG. 14, which provides main video item and sub video item(s) in a list form.

Here, as mentioned above, when the user selects the main video item and performs a predetermined action, the window is provided as shown. In general, a sub video item in such a web page structure can be reproduced by selecting it. If the video must be selected and viewed as a main video to know the contents of the video, it must be reproduced and viewed every time when one wants to know the contents of a video. Thus, in this case, any operations such as switching to a different web page or searching for something else on the same web page are never possible.

However, in the present disclosure, if the initial window is provided regardless of whether it is a main or sub video, a video window list can be added by simply dragging and dropping the window. Then, the user can continue to enter a search word to use another web page or change to a different web page. On the other hand, the window can have an additional text input box to input search words or controlling words, and if there is metadata related to linked videos added to the video window list, a relationship of the video and the inputted search word can be displayed by comparing the search word or controlling word with the videos.

FIGS. 16 to 18 illustrate embodiment(s) for the intelligent service (IS) when the channel is switched.

In FIG. 16, as mentioned above, when one or more videos are registered as arbitrary channels, a video is provided according to the channel change by the input means as shown in FIG. 16a, and the initial broadcast program can be provided back on the screen according to the channel change as shown in FIG. 16b.

As shown in FIG. 16, when one or more videos are registered as arbitrary channels, FIG. 17 shows an embodiment of displaying an identifier (mark) 1710 to identify the channel that the user presently proceeds as the arbitrary channel, not the broadcasting channel that provides conventional broadcast programs. An EPG provided as shown in FIG. 18 can be displayed as such.

On the other hand, in FIG. 17 or/and FIG. 18, if the user selects an arbitrary channel category 1810 on the EPG (similar to broadcast programs), detailed information about additional time, video size, resolution, codec, total playing time (duration), the number of plays, main character, view discretion, genre, and the like can be provided on an additional window or in the EPG.

On the other hand, FIG. 19 illustrates an embodiment for the intelligent service control through a mobile digital device.

As shown in FIG. 19a, if the digital device is a TV, arbitrary channels are provided through the screen or if a window is executed, a paired mobile device can snatch, snap a shot of the window, or point (or hover) at it for a predetermined time. Then, as shown in FIG. 19b, data (including URL) can be transmitted to and reproduced on the mobile phone from the current resuming point or the starting point. On the other hand, as shown in FIG. 19c, the viewing video by executing the application of the mobile device can be reproduced through the broadcast channel screen of the digital device or the window as shown in FIG. 19d. In this case, the aforementioned intelligent service method can be applied to the mobile device.

On the other hand, although the intelligent web service (IWS) is mainly described above, the present disclosure is not limited to videos of the web service. For example, various images besides videos can exist on the web page of the web browser and various images or data can exist on the screens of the executed application and broadcasting channels or other screens and can be selected. Thus, the intelligent service (IS) can be provided by the same or similar video processing to the aforementioned method according to a predetermined action after capturing or selecting such information by a motion remote controller.

On the other hand, it is possible to allocate arbitrary channels for not only videos but also the captures or image information, and this shows that the allocation of the arbitrary channels can be done for types and kinds of data. Thus, it is possible to proceed to and use the captured images by changing channels.

Also, when the user proceeds to the aforementioned intelligent service page by changing channels, the PIP is operated as a default and the other channel besides the intelligent service on the PIP (channel that should have been switched to for the initial broadcast program when the channel is changed) can be provided on the full screen by switching to a main screen. The PIP window is provided only for the intelligent service channels so that the user can identify the corresponding channels as the intelligent channels.

On the other hand, the aforementioned intelligent web service (IWS) can provide additional services by the Cloud server or the manufacturer's service server.

For example, if an URL address or metadata for the intelligent web service (IWS) related to the video of each digital device is uploaded in the Cloud server or the manufacturer's service server, this can be data-based and utilized as additional information when it is requested by other digital devices.

FIG. 20 illustrates a flowchart of a method for a service data process in the digital device.

The digital device provides a first web page including video according to a web browser's execution (S2002).

By selecting video on the first web page and receiving a predetermined user's action, a PIP window is output in response to the selection and the user's action (S2004). Here, when the PIP window is output, the reproducing of the selected video on the first web page can be pause or terminated.

Then, the selected video on the first web page is resumed on the output PIP window (S2006).

By receiving a switching request to a second web page from the user, the second web page is provided according to the switching request (S2008). When the second web page is output, video on the PIP window can continue to stay on. If there is overlapping between the PIP window and the switched second web page, the PIP window has the priority (e.g., upper layer) and is output over the second web page as for the overlapping portion.

If there receives an arbitrary channel registration request for the video reproducing on the PIP window, the digital device allocates a channel number of an arbitrary channel for the video (S2010).

If there receives a request for providing an EPG, the digital device outputs the requested EPG on the screen (S2012). Here, the EPG can include a category (e.g., PIP window video category) in which the arbitrary channel is allocated.

A broadcast program is provided (S2014) and the channel is switched according to the channel switching request (S2016). Here, the switched channel can be a predetermined allocated arbitrary channel in the order of the channels, that is, a video channel of the PIP window. If the request for channel switching is for the video channel of the PIP window, a broadcast program that should have been initially accessed to is provided on a PIP window and an identifier to identify the video channel on the predetermined area of the video channel screen can be displayed.

According to the present disclosure, video included on the web page provided through the web browser is kept separated from the other contents of the web page and can continue to be viewed although the web page is changed to a different web page. At least one of various elements of a content and an application provided on the screen can be separated from the content and the application and then processed. According to the user's needs or request in the content and application, the selected portion of the content and the application can be separately processed, thus improving the user's satisfaction and minimizing inconvenience.

According to the present disclosure, an advanced or intelligent service that meets the user's intention and needs and, as an example, an intelligent web service that meets the user's intention and needs are provided through the screen of the digital device in the service system and through the web browser, respectively. And, one of various elements of a service and content is selected or at least one of the elements of the service and content is separated or separately processed/controlled. Video included on the web page provided through the web browser is separated and processed from the corresponding web page. Video separated and processed from one web page can be outputted or/and simultaneously controlled with not only web services such as providing it to a different web page but also other services and contents unrelated to the web service. As such, user friendly services that correspond to the user's needs, intention, and request can be provided, the satisfaction can be improved, and inconvenience can be minimized by the intelligent service (IS) including the intelligent web service (IWS).

The service system, digital device and its service processing method is not limited to the illustrated embodiments of the configurations and methods and some of the embodiments can be selectively combined to make various modifications.

On the other hand, the operating method of the digital device illustrated in the present disclosure can be realized by a code that is readable by a processor in a recording medium readable by the processor included in the digital device. The readable recording medium by the processor includes all types of recording media that store data readable by the processor. Examples of the recording medium readable by the processor are a ROM (Read Only Memory), RAM (Random Access Memory), CDROM, magnetic tape, floppy disk, optical data storing device, and devices that transmits via internet such as a carrier-wave type. Also, the recording medium readable by the processor is distributed in the computer system connected to the network and the code readable by the processor is stored and executed by the distributing method.

On the other hand, although the present disclosure is illustrated with limited embodiments and drawings, the present disclosure is not only limited to the embodiments and people ordinarily skilled in the art may modify and vary the limits of the present disclosure. Accordingly, the spirit of the present disclosure shall be analyzed within the scope of the appended claims, and it is intended that the present disclosure covers the modifications and variations of this invention provided they come within the scope of the appended claims and their equivalents.

INDUSTRIAL APPLICABILITY

The present invention relates to a digital device and a method of processing service data thereof and is applicable to all digital apparatus.

The invention claimed is:

1. A method for processing service data in a digital device, the method comprising:
executing a web browser and outputting a first web page including a first video and a second video through the executed web browser;
receiving a first user action, the first user action requesting to select the first video included in the first web page;
outputting a first picture-in-picture (PIP) window reproducing the first video included in the first web page on a screen according to the first user action;
receiving a second user action, the second user action requesting to select the second video included in the first web page; and
outputting a second picture-in-picture (PIP) window reproducing the second video included in the first web page on a screen according to the second user action,
wherein an audio of the first video, reproduced from the first PIP window, is provided through speakers of the digital device, and
audio of the second video, reproduced from the second PIP window, is muted and information corresponding to the audio of the second video is output in subtitles rather than audio.

2. The method of claim 1, wherein the first video included in the first web page is terminated when the first PIP window is outputted.

3. The method of claim 2, further comprising:
receiving a third user action requesting to output a second web page including a third video; and
outputting the second web page.

4. The method of claim 3, wherein the first video on the first PIP window reproduces continuously regardless of the outputting of the second web page.

5. The method of claim 4, wherein the first PIP window is output on a higher layer than that at least one of the first and the second web page such that if there is an overlapping area between the first PIP window and at least one of the output first and second web page, the first PIP window is prioritized in the overlapping area.

6. The method of claim 5, further comprising:
receiving a request for registering one or more videos reproducing on the first PIP window as a channel; and
allocating an arbitrary channel number to each of the one or more videos in response to the request, wherein the arbitrary channel number is not overlapped a channel number that is previously allocated to a broadcasting channel.

7. The method of claim 6, further comprising:
receiving a request for outputting an electronic program guide (EPG); and
outputting the requested EPG, wherein the EPG includes the allocated arbitrary channel number.

8. The method of claim 7, further comprising:
outputting a content of a tuned channel;
receiving a request for changing a channel; and
outputting the changed channel according the request, wherein the changed channel includes the allocated channel in the order of channels.

9. The method of claim 8, wherein if the requested channel is an allocated arbitrary channel, a video of the allocated arbitrary channel is output on the screen with an identifier identifying that a corresponding channel is the arbitrary channel on a predetermined area of the screen and wherein a content of a next channel is simultaneously output through a PIP window on the screen during outputting the arbitrary channel, the next channel being a broadcasting channel and not an arbitrary channel.

10. The method of claim 9, wherein the digital device includes a digital television and a mobile device.

11. A digital device comprising:
a receiver receiving a broadcast signal that contains a content and signaling information including channel information by tuning a channel;
a user interface receiving a request for executing a web browser and a first user action requesting to select a first video included in a first web page through the executed web browser, and a second user action requesting to select a second video included in the first web page through the executed web browser;
a controller controlling to execute the web browser, output a first web page including the first video and the second video according to the request, and output a first picture-in-picture (PIP) window reproducing the first video included in the first web page on a screen according to the first user action and a second picture-in-picture (PIP) window reproducing the second video included in the first web page on a screen according to the second user action; and
an output unit outputting the web browser outputting the first web page and the first and second PIP windows,
wherein an audio of the first video reproduced from the first PIP window is provided through speakers of the digital device, and
audio of the second video reproduced from the second PIP window is muted and information corresponding to the audio of the second video is output in subtitles rather than audio.

12. The digital device of claim 11, wherein the controller controls to terminate the first video included in the first web page when the first PIP window is output.

13. The digital device of claim 12, wherein the user interface further receives a third user action requesting to output a second web page including a third video, and the controller further controls to output the second web page.

14. The digital device of claim 13, wherein the controller controls to reproduce continuously regardless of outputting the second web page.

15. The digital device of claim 14, wherein the controller controls to output the first PIP window on a higher layer than that at least one of the first and the second web page such that if there is an overlapping area between the first PIP window and at least one of the output first and second web page, the first PIP window is prioritized in the overlapping area.

16. The digital device of claim 15, wherein the user interface further receive a request for registering one or more videos reproducing on the first PIP window as a channel and the controller controls to allocate an arbitrary channel number to each of the one or more videos in response to the request, wherein the arbitrary channel number is not overlapped a channel number that is previously allocated to a broadcasting channel.

17. The digital device of claim 16, wherein if a request for outputting an electronic program guide (EPG) is received, the controller controls to output the requested EPG, wherein the EPG includes the allocated arbitrary channel number.

18. The digital device of claim 17, wherein the controller control to output a content of a tuned channel, and if a request for changing a channel is received, the controller controls to output the changed channel according to the request, wherein the changed channel includes the allocated channel in the order of channels.

19. The digital device of claim 18, wherein if the requested channel is an allocated arbitrary channel, the controller controls to output a video of the allocated arbitrary channel on the screen with an identifier identifying that a corresponding channel is the arbitrary channel on a predetermined area of the screen and wherein a content of a next channel is simultaneously output through a PIP window on the screen during outputting the arbitrary channel, the next channel being a broadcasting channel and not an arbitrary channel.

20. The digital device of claim 19, wherein the digital device includes a digital television and a mobile device.

* * * * *